Patented June 26, 1951

2,557,987

UNITED STATES PATENT OFFICE 2,557,987

METHOD FOR EXTRACTING USNIC ACID

Alfred G. Marshak, Brooklyn, N. Y.

No Drawing. Application September 9, 1947,
Serial No. 773,067

3 Claims. (Cl. 260—345)

(Granted under the act of March 3, 1883, as
amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to therapeutic compositions and methods of administering them. More particularly this invention relates to an antibiotic crystalline substance derived from the lichen *Ramalina reticulata* and means and methods for administering this antibiotic to animals.

This application is a continuation-in-part of my application Serial No. 738,503, filed March 31, 1947, now abandoned, entitled "Therapeutic Composition and Method."

Since the discovery of the tubercule bacillus repeated and persistent efforts have been made to find a drug or antibiotic that would be effective in the cure of tuberculosis. Tremendous effort over a great length of time has been expended to find a lethal agent to defeat a germ that has consistently resisted every attempt against its predatory existence. Over the years the hopes of the ill have been lifted by such attempts at treatment as tuberculin injections, gold therapy, the applications of sulpha drugs, and various vaccines. In every instance the high hopes were dashed by failure.

It is an object of this invention to provide a new antibiotic.

It is a further object of this invention to provide a new compound toxic to tubercule bacilli in vitro.

It is a further object of this invention to provide a new compound toxic to tubercule bacilli in vivo.

It is a further object to provide a method of extracting an antibiotic from the lichen *Ramalina reticulata*.

It is a further object to provide a new compound toxic to the tubercule bacillus and capable of being absorbed by an animal system.

It is a further object to provide a method of and means for administering therapeutics to animals.

The foregoing and other objects hereinafter apparent are accomplished in accordance with this invention wherein a therapeutic composition is caused to be assimilated in an animal circulatory system by being dissolved in oil and combined with a dispersing, wetting and/or emulsifying agent and injected in said animal, and wherein there is provided an antibiotic substance and a method of extracting this antibiotic substance from the lichen *Ramalina reticulata*.

*Ramalina reticulata* (Noedh.) Kremph., sometimes called California Spanish moss, is a lichen of the family Usneaceae which grows as an epiphyte along the west coast of North America from California to Alaska. The plant has no integument but does contain in the interstices between hyphae and alga cells a carbohydrate substance which is very hygroscopic, so that under foggy conditions it is soft, friable, and saturated with water. The eastern and the California Spanish moss are not in any way related. The former is a seed plant of the family Bromeliaceae and the latter is a lichen.

Method of extraction

The antibiotic may be extracted from the lichen *Ramalina reticulata* by any of the following methods:

*Method 1.*—The lichen is extracted by boiling for four hours with acetone (2 parts) and alcohol (1 part). The extract is filtered and after standing at room temperature with slow evaporation for a week a copious green preciptate appears which is filtered off. The precipitate is dissolved in boiling acetone and filtered while hot. On cooling yellow needle-like crystals appear. The green mother liquor is decanted and the crystals washed with alcohol and acetone. The crystals are again dissolved (the solution is now yellow) recrystallized and washed. This process of dissolving, recrystallization and washing is repeated two more times. With slow crystallizaton crystals as long as one inch can be obtained.

*Method 2.*—The cleaned lichen is packed in 6-gallon earthenware crocks and covered with acetone (2 parts) and alcohol (1 part). Approximately 10 pounds of lichen to 60 pounds of acetone alcohol are employed. After standing approximately 12 hours the yellow green solution is decanted, filtered, and poured into enamelware pans, the pans are put outdoors and protected against direct sunlight. In a brisk breeze evaporation proceeds rapidly and in a few hours a copious green precipitate appears and is filtered off. The red brown mother liquor is evaporated further until only an amorphous tan precipitate is produced. The green precipitate is dissolved in boiling acetone and filtered rapidly while hot. The filtrate is then concentrated by boiling to about one-tenth its orignal volume. On cooling, crystallization occurs rapidly. The green mother liquor is then decanted and the yellow crystals are washed with cold acetone. The process of dissolving, recrystallizing and washing is repeated two more times.

*Method 3.*—Extraction with cold acetone is carried out as described in method 2. The mother liquor in this case is yellow. The separation of crystals from amorphous material was carried out as in method 2.

*Method 4.*—58 grams of lichen are extracted with 600 cc. of chloroform at room temperature for about 21 hours. The solvents are removed by evaporation and the sediments dissolved in hot acetone. On reducing the volume of the acetone to ¼–⅓ of the original volume, crystalline precipitates are obtained which are dissolved, recrystalized and washed two more times.

The yield by methods 2 and 3 is approximately 8 gm. of purified crystalline material per 10 pounds of lichen. The yield by method 4 is approximately 16 gm. of purified crystalline material per 10 pounds of lichen, the yield by chloroform extraction being approximately twice as large as that obtained by acetone extraction, where equal volumes of each solvent per unit weight of lichen are compared.

Properties of the crystalline material

The crystalline material extracted from the lichen *Ramalina reticulata* by any of the foregoing methods is readily soluble in hot acetone, ethyl alcohol, propylene glycol, ethyl ether, chloroform, carbon tetrachloride; poorly soluble in hot petroleum ether, cold alcohol, propylene glycol; and moderately soluble in cold acetone. The material is insoluble in water and in HCl.

Solubility studies have shown that the pure crystalline material is about 10 times more soluble in chloroform than in acetone, thus indicating that it may be possible to extract the crystals from the lichen with a volume of chloroform roughly 1/20 the volume of the acetone which would have to be used for the same process.

The melting point of the crystalline material is 191–192° C. when heated at an increment of 0.2° per minute, after first being brought rapidly to 160° C. The melting point is 192–194° C. when heated at a uniform increment of 0.5–1.0° per minute. The melt is brown. The crystals obtained when the melt cools are yellow-brown. The crystals melt readily in camphor. However, when the mixture is again heated there appears to be progressive decomposition with no definite melting point.

The substance is acid and has a neutralization equivalent of 298–310, as measured by titration in acetone.

On analysis, no ash, nitrogen, or halide is found. The percentage composition of the crystalline material obtained with hot acetone extraction is (a) C—62.75, H—4.63, (b) C—62.75, H—4.69. Analysis of the material extracted with cold acetone-alcohol gives a percentage composition of (a) C—63.05, H—4.49, (b) C—63.00, H—4.64. The material contains no methoxyl groups. The results of analysis indicate one group per molecule titratable as an acid. Original analysis was done with a methoxyl derivative of the extract because of doubt concerning the purity of the parent compound. Analysis of the methoxyl derivative gave analytical data which fitted the empirical formula $C_{16}H_{14}O_6$. Later investigation indicated that the extracted compound was homogeneous and analysis was carried out on the parent compound.

The parent compound extracted from the lichen *Ramalina reticulata* from the accumulated analytical data, homogeneity studies, ultra violet and infra red spectroscopy, optical rotation and X-ray analysis, is strongly suggested to be d-usnic acid, with an empirical formula $C_{18}H_{16}O_7$.

Antibacterial properties in vitro

The growth of the bacteria *Pneumococcus*, *Streptococcus* and some of the *Staphylococci* are inhibited by 50 gamma per cc. or less. Experiments designed to define more closely the minimal effect of concentration in strains of *Pneumococcus* and *Streptococcus* showed complete sterilization with concentrations of 10 to 20 gamma per cc. in the former while in the latter the variation between strains was much greater, i. e., from 10 to over 50 gamma per cc. The human strains of tubercle bacilli showed complete inhibition by concentrations of 1 to 50,000 and noticeable inhibition at concentration as low as 2 to 2,000,000 with the exception of the Waller strain which required a concentration of 1 to 20,000 for complete, and 1 to 200,000 for partial inhibition.

Properties in vivo

Saline suspensions of the crystalline material do not provide an adequate means for dispersing the antibacterial agent in the animal body. Solutions in oil alone are also unsuitable since a good deal of the oil remains in situ after injection although some oil may be incorporated into the fat cells. The crystalline substance may be dissolved in oil by being first dissolved in acetone which is combined with the oil, the acetone then being distilled off. By dissolving the crystalline material in sesame oil and combining the oil with a dispersing, emulsifying or wetting agent such as Tween 80 (polyoxyalkylene ether of sorbitan monooleate) in suitable proportions is was possible to have the oil taken up into the animal circulatory system with no obvious local or systemic injury. In mice (25 gm.) one-half to one mg. in 0.15 cc. oil containing 10 percent Tween 80 could be taken up without appreciable damage while 0.2 mg. in a single dose was lethal. 30 mg. of the crystalline material given twice daily to 250–350 gm. guinea pigs was lethal, while 20 mg. given once daily was not. In guinea pigs (350–400 gm.) a single 1 cc. dose of Tween 80 and oil having greater amounts of Tween than 1 part to 9 parts of oil produced swelling of the fascia. Repeated daily injections in guinea pigs (350–400 gm.) of 1 cc. of a mixture of 1 part Tween 80 to 9 parts oil produced swelling of the fascia after three days, but a mixture of 0.1 cc. of 20% Tween 80 in saline (.85% sodium chloride in distilled water) plus 0.9 cc. of oil given in 0.5 cc. daily injections did not produce swelling. 20 mg. of the crystalline material given guinea pigs (250–320) in a 1 cc. emulsion by a single injection is not completely absorbed after four days, whereas, 10 mg. in the same volume of emulsion is completely absorbed in two days. 0.1 cc. of a 20 percent solution of Tween 80 in saline added to .9 cc. oil produces a fine emulsion stable for about 48 hours. The crystals are dissolved in oil and the solution emulsified in the saline. When emulsified some of the crystalline material precipitates out but is easily resuspended. At room temperature the mixture of crystals-Tween-oil-saline appears as an emulsion with some of the crystalline material dispersed in it as a solid. At the temperature of the body (37° C.) however, the crystalline substance is completely dissolved in this mixture.

In a test lasting thirty-two days a number of guinea pigs were intraperitoneally inoculated with .01 mg. of tubercle bacilli. The group of guinea pigs receiving daily subcutaneous injections of between 10 and 20 mg. of the antibiotic crystalline material in oil combined with Tween 80 and saline for 21 days days lost less than half as much weight as the infected guinea pigs not receiving the antibiotic treatment.

Reference is made to "Public Health Reports" for January 3, 1947, volume 62, No. 1, printed by the U. S. Public Health Service, pages 3–19, for a more complete disclosure of the tests made with the crystalline antibacterial substance derived from the lichen *Ramalina recticulata* in retarding the progress of human strains of the tubercle bacilli in animals.

It will be appreciated that the invention is susceptible of various changes without departing from the spirit and scope thereof, as set forth in the appended claims.

What is claimed is:

1. A process for isolating usnic acid from the lichen *Ramalina reticulata* which comprises treating said lichen with a solvent selected from the group consisting of chloroform and acetone, filtering the extract to remove the insoluble elements of said lichen therefrom, maintaining said extract filtrate at substantially room temperature for a time sufficient to allow a precipitate to form therein, dissolving said precipitate in a solution of hot acetone, and then cooling the thus formed solution whereby crystals of usnic acid are formed.

2. A process for isolating usnic acid from the lichen *Ramalina recticulata* which comprises treating said lichen with acetone, filtering the extract to remove the insoluble elements of said lichen therefrom, maintaining said extract filtrate at substantially room temperature for a time sufficient to allow a precipitate to form therein, dissolving said precipitate in a solution of hot acetone, and then cooling the thus formed solution whereby crystals of usnic acid are formed.

3. A process for isolating usnic acid from the lichen *Ramalina reticulata* which comprises treating said lichen with cholorform, filtering the extract to remove the insoluble elements of said lichen therefrom, maintaining said extract filtrate at substantially room temperature for a time sufficient to allow a precipitate to form therein, dissolving said precipitate in a solution of hot acetone, and then cooling the thus formed solution whereby crystals of usnic acid are formed.

ALFRED G. MARSHAK.

REFERENCES CITED

The following references are of record in the file of this patent:

UNITED STATES PATENTS

| Number | Name | Date |
|---|---|---|
| 1,796,070 | Waterhouse | Mar. 10, 1931 |
| 2,017,596 | Hoffman | Oct. 15, 1935 |
| 2,059,811 | Sauer | Nov. 3, 1936 |
| 2,170,872 | Peebles | Aug. 29, 1939 |

OTHER REFERENCES

Perkin et al.: "The Natural Organic Colouring Matters," pp. 530–542 (1918).

Chemical Abstracts, vol. 17, p. 3184 (1923).

Curd et al.: J. Chem. Soc. (London), 1933, p. 1173.

Asahina et al.: Berichte, vol. 66, p. 1256 (1933).

Marshak et al.: Proc. Soc. Exp't'l. Biol. Med., vol. 70, p. 565 (1949).